(No Model.) 7 Sheets—Sheet 1.

C. KIMPLEN.
CRUSHING AND GRINDING MACHINE.

No. 281,887. Patented July 24, 1883.

Witnesses:
Albert H. Adams
O. W. Bond

Inventor:
Cornelius Kimplen
By West & Bond
Attys.

(No Model.) 7 Sheets—Sheet 2.

C. KIMPLEN.
CRUSHING AND GRINDING MACHINE.

No. 281,887. Patented July 24, 1883.

Fig. 2.

Witnesses:
Albert H. Adams
O. V. Bond

Inventor:
Cornelius Kimplen
By West & Bond Attys.

(No Model.) 7 Sheets—Sheet 3.

C. KIMPLEN.
CRUSHING AND GRINDING MACHINE.

No. 281,887. Patented July 24, 1883.

Witnesses:
Albert H. Adams.
O. W. Bond.

Inventor:
Cornelius Kimplen
By West & Bond.
Attys.

(No Model.)  7 Sheets—Sheet 4.
C. KIMPLEN.
CRUSHING AND GRINDING MACHINE.

No. 281,887. Patented July 24, 1883.

Witnesses:
Albert H. Adams.
O. W. Bond.

Inventor:
Cornelius Kimplen.
By West & Bond.
Attys.

(No Model.)  7 Sheets—Sheet 5.

C. KIMPLEN.
CRUSHING AND GRINDING MACHINE.

No. 281,887.  Patented July 24. 1883.

Witnesses:  Inventor
  Cornelius Kimplen
  By West & Bond
  Attys.

(No Model.) 7 Sheets—Sheet 6.

C. KIMPLEN.
CRUSHING AND GRINDING MACHINE.

No. 281,887. Patented July 24, 1883.

Witnesses,
Henry Frankfurter
Albert H. Adams

Inventor,
Cornelius Kimplen
By West & Bond
His Atty.

(No Model.)

C. KIMPLEN.
CRUSHING AND GRINDING MACHINE.

No. 281,887.  Patented July 24, 1883.

UNITED STATES PATENT OFFICE.

CORNELIUS KIMPLEN, OF CHICAGO, ILLINOIS, ASSIGNOR TO HIMSELF AND THE NORTHWESTERN FERTILIZING COMPANY, OF SAME PLACE.

CRUSHING AND GRINDING MACHINE.

SPECIFICATION forming part of Letters Patent No. 281,887, dated July 24, 1883.

Application filed June 3, 1881. (No model.)

*To all whom it may concern:*

Be it known that I, CORNELIUS KIMPLEN, residing at Chicago, in the county of Cook and State of Illinois, and a citizen of the United States, have invented new and useful Improvements in Crushing and Grinding Machines, of which the following is a full description, reference being had to the accompanying drawings, in which—

My improvements relate to mills for crushing and pulverizing stone, bone, and other substances.

The improvements will be fully hereinafter described in detail, and specifically set forth in the claims.

Figure 2:
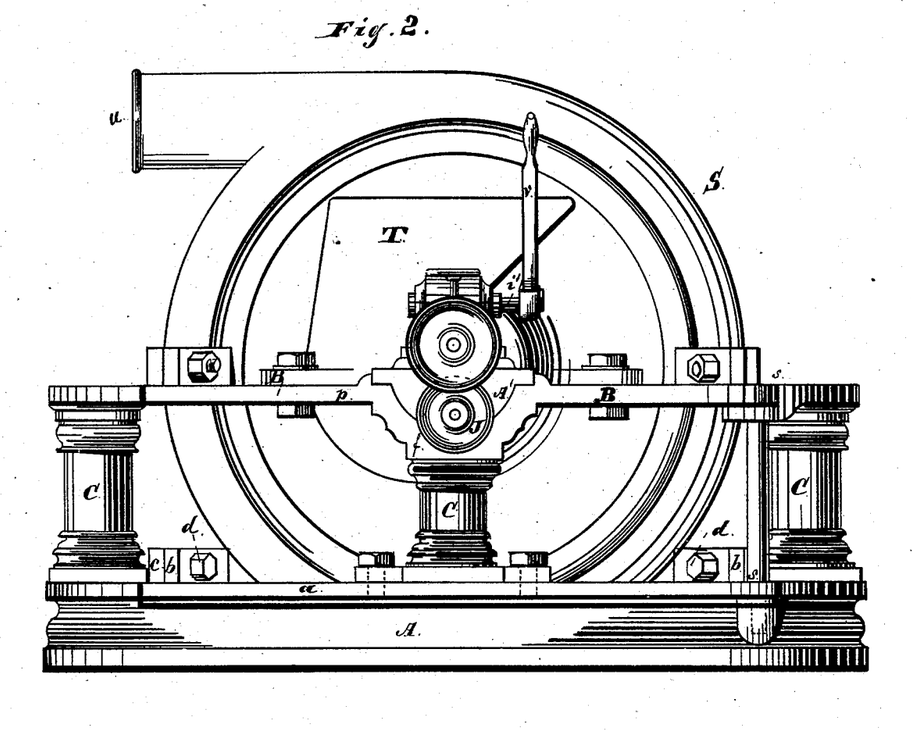
Fig. 2 is a front elevation.

In the drawings, A represents a circular annular base. B is a circular annular plate of great strength, resting upon and secured to the four posts C, which posts are supported on the base A. These parts A B and posts C form a main frame, all parts of which are heavy and strong. A portion, $a$, of the base, at the front, is made separate from the main part of such base. This piece $a$ is secured to the main part of the base, so that it is movable. As shown, there is a flange, $b$, at each end of this part $a$, and similar flanges, $c$, upon the main part of the base, through which flanges bolts $d$ pass, securing $a$ in place. I do not limit myself to this exact method of securing this part $a$ to the main base. The plate B has a cross-piece, $e$, at the center, and the base A has a similar cross-piece. The plate B is curved downward at two of the posts C, as seen at $f$, Fig. 2.

D is a shaft supported at its ends and at the center in suitable bearings, the central one being supported on a post, E, which is arranged on and sustained by a cross-piece forming part of the base. This shaft has a limited longitudinal movement in its bearings. At one end of this shaft is a half-box, $a'$, which partly encircles the shaft. It has a rack, $g$, upon the top, and a downward projection, $h$, at the outer end, which engages with the end of the shaft.

F is a cog-wheel on a small shaft, $i$, which wheel engages with the rack $g$. On each end of this shaft $i$ is a pulley, G. To each of these pulleys a rope is secured, carrying a weight, W, at the free end. At the opposite end of the shaft is a similar box, $a''$, rack $g''$, and projection $h''$; also a cog-wheel, F', engaging with the rack $g''$, and mounted on a small shaft, $i'$.

The racks and the cog-wheels F and F' are both incased in a suitable boxing to keep out dust, as will be understood from the drawings.

$j$ are oil-passages.

H is a screw, the inner end of which bears against the projection $h''$.

I is a set-screw, the lower end of which comes in contact with the screw H.

The bearing for the front end of the shaft D, and the parts and casings connected therewith, including the rack $g''$ and wheel F', can all be drawn forward together, so as to clear the end of the shaft D by means of the screw J. To effect such movement the threaded part of the said screw passes through a threaded aperture in a projection, $n'$, on the plate B, and there is a downward projection, $p'$, on the bearing A', which is arranged between two fixed collars, $r'$ $r''$, on the shank of the screw, and consequently the rotation of the screw J in the projection $n'$ adjusts the bearings A' in the manner above set forth.

Figure 6:
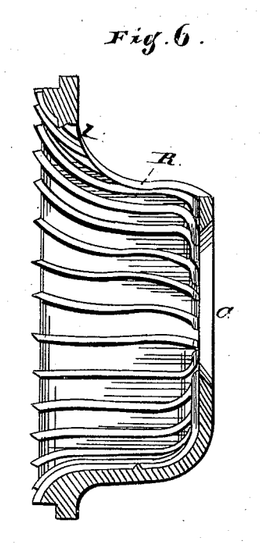
Fig. 6 is a section of the central part of the stationary grinder, taken on the line $y$ of Fig. 4.
Figure 7:
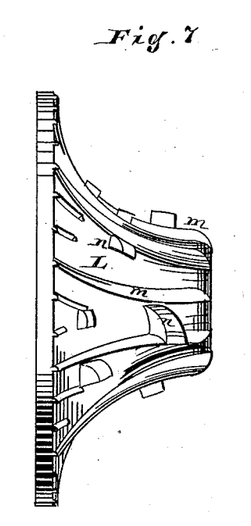
Fig. 7 is a side elevation of the movable grinder.

The movable crusher and grinder consists of two parts—a central part L, which is somewhat cone-shaped, and an annular outer piece, M. These two parts L M are bolted to a backing, N, which is rigidly secured to the shaft D. The stationary crusher and grinder also is formed of two parts—a central part O and an outer annular part, P, both of which are bolted to a piece, Q, of suitable shape, which forms a part of the case or shell for the grinders. The central conical portion O of the stationary crusher and grinder has a novel construction and arrangement in relation to the central conical portion of the movable grinder, by which its center and the center of the movable grinder are not in a common point, the result being that the grinding surface or wall of this outer grinder is not concentric with the center, but is scroll-shaped, being gradually drawn in toward the center from the point $k$ at one end of the opening R, where the material enters, around to the opposite side, $l$, of this opening, as is clearly shown in Figs. 4 and 6. The central portions of both crushers are provided with ribs $m$, and the revolving one also has projections $n$ to aid in crushing the material.

Figure 1:
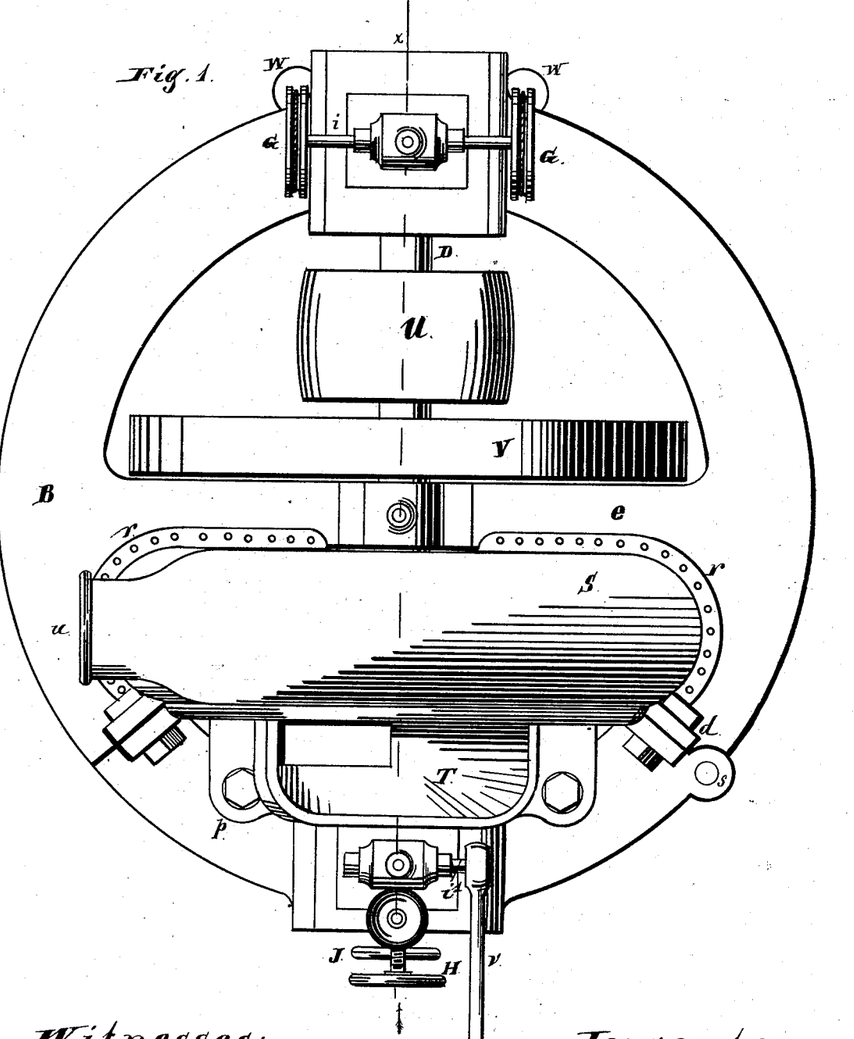
Figure 1 is a plan.

The plate or ring B, which forms the upper part of the frame, is made in two pieces, the smaller of which, $p$, is secured to the larger by means of flanges and bolts, as shown in Fig. 1, or in other suitable manner. This piece $p$ is also hinged to the main part of B, Figs. 1 and 2, and it is located directly over the piece $a$ of the bed-piece A.

S is a shell or case for the grinders. It is made in two parts, the rear portion being permanently secured to the frame by means of flanges and bolts. The upper flanges are seen at $r$, Fig. 1. The front portion, Q, of the case is securely connected to the separate piece $a$ of the base A, and also to the piece $p$ of the upper part, B, of the frame, which can be done by means of suitable flanges and bolts. One of the posts C that one which supports the front bearing for the shaft D—and parts connected therewith—rests upon the separate piece $a$ of the base A. This piece $a$ and the piece $p$ of the part B are hinged at one side at $s$, (see Figs. 1 and 2,) and the front Q of the the case being connected to these parts $a$ $p$, it can be swung open when desired, as more fully described hereinafter.

T is a hopper, which is cast upon and with the front Q of the case.

$t$ is an annular disk encircling the shaft D, behind its front bearing, to prevent the escape of material from the mill into this bearing.

U is a pulley, and V a fly-wheel, on the shaft D.

$u$ is the outlet for the ground material.

$v$ is a lever upon the shaft $i'$.

Figure 3:
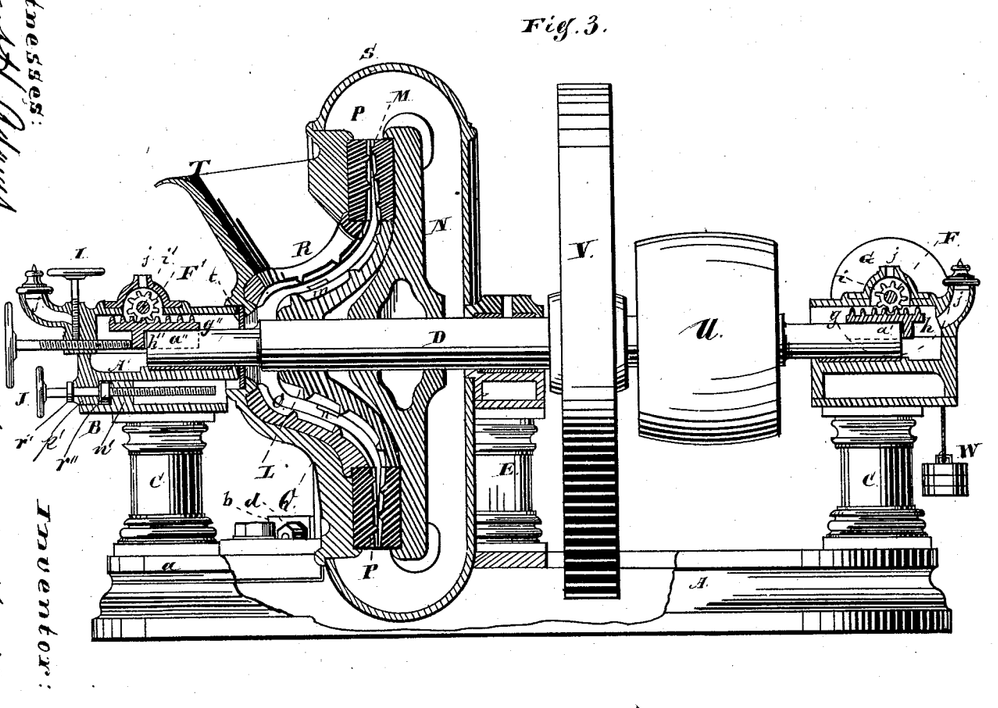
Fig. 3 is a vertical section at line $x$ of Fig. 1, some parts being in elevation.

A' is the bearing for the front end of the shaft D. It is not rigidly connected to the main frame, but rests in the depressed part $f$ of B, and can be moved both forward and back by means of the screw $j$, as will be understood from Fig. 3. By elongating the central portions of the two grinders, placing one within the other, and gradually contracting the surface of one of them, I form a contracting passage between these parts of the grinders, which greatly facilitates the crushing of large pieces of material.

Figure 4:
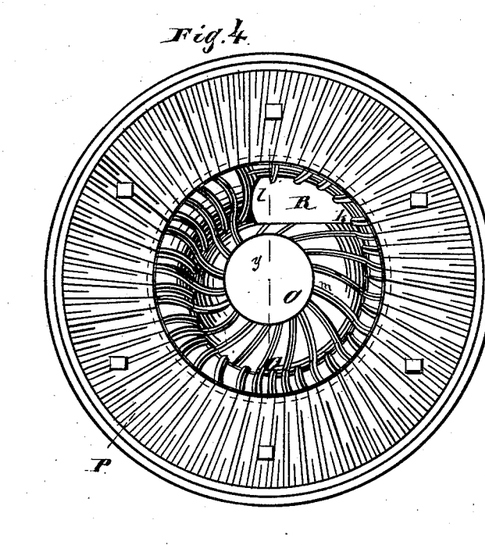
Fig. 4 is an inside view of the stationary grinder.
Figure 5:
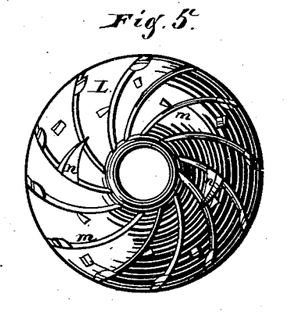
Fig. 5 is a plan of the central part of the movable grinder.

The operation is as follows: Suppose the parts to be in the position shown in the drawings. The material to be crushed and ground is to be fed into the hopper, and will first pass through the opening R in between the central conical part of the crushers, the space between which is large upon one side and gradually contracts, as shown in Fig. 4, and as the large pieces are drawn in by the revolution of the movable crusher, they will be gradually crushed and broken as they pass into the contracting space between the fixed and moving crushers. The crushed material will then be carried in between the outer parts, M and P, of the grinders, and, having been ground quite fine, will pass into the case S, and will be delivered at $u$. The scroll shape which I have given to the central part of one of the crushers is important. The shaft D has a little free longitudinal movement, and it, with the movable grinder, is not held rigidly in place; but by means of the box $a'$, rack $g$, projection $h$, cog-wheel F, and weights W, the movable grinder is forced toward the stationary grinder and held under a given pressure, which can be varied at pleasure by changing the weights W. In use the weights are to be sufficient to hold the parts in place under ordinary conditions. If, however, a piece of iron or other substance enters the mill which it has not power to grind, the shaft D and the movable crusher and grinder will be forced back a little, the resistance overcoming the pressure of the weights W, and such hard piece can pass through the mill without breaking the same.

The movable grinder can be adjusted for grinding fine or coarse by means of the box $a''$, with its projection $h''$, and cog-wheel F', lever $v$, and screw H, as by means of these devices the shaft D, with the movable grinder, can be pushed back, and held so as to grind coarse. By turning out the screw H as may be desired, the weights W will force the shaft D forward, and the grinding will be finer. The only office of the screw I is to prevent the accidental displacement of the screw H. The bearing which supports the front end of the shaft D, with the box $a''$, and the wheel F', with the housing above it, can all be moved together by means of the screw J. The object of this construction is to permit the bearing and parts connected therewith to be drawn out to allow the front Q of the case S to be opened. This can be done by removing the bolts which hold the part $a$ of the base A and the part $p$ of the plate B in place, and by drawing forward and removing the bearing A'. Then the part $a$ of the base A and the part $p$ of B, and the front Q of the case, with the fixed grinder, can all be swung on the hinge at $s$; and in this way access can be had to the interior of the mill for the purpose of repairing the grinders, or for any other purpose. When the bearing A' has been removed, the front Q of the case will swing clear of the front end of the shaft D. As this shaft has a bearing at the center, it will be supported after the bearing at its front end has been withdrawn.

By means of the lever $v$, the shaft $i'$, the cog-wheel F'', rack $g''$, and bearing $a$, the operator can move the shaft D and movable grinder back to allow obstructions which may have entered the mill to pass; and when the lever is released, the action of the weights will return the shaft and grinder to their former position. The operator can throw the movable grinder back by means of the lever $v$, if he finds that the mill is clogging, to allow it to clear itself, which is a great advantage, and in use will save much time and labor, as without some such construction it would be necessary to stop the grinding and open the mill in case of clogging.

The revolving grinder is mounted on the end of the shaft D and revolves therewith, and its center will be the center of the shaft. The stationary grinder is secured to its casing or backing, which casing or backing, although in a true circle by itself, has its center to one side of the center of the shaft G, the result being that the center of the revolving grinder and the center of the stationary grinder are at two different points in relation to each other, and these central points are arranged to form a wide channel or passage on that side of the grinders at which the material enters, which channel or passage, as it continues around, gradually contracts, so that at the point where the material passes to the flat or final grinding-surfaces the channel or passage is very small or narrow. This construction and arrangement forms an eccentric or scroll shaped channel or passage, by which the material as it enters is drawn around between the crushing-surfaces of the conical portions of the grinders, is subjected to a gradually-increasing pressure as it continues toward the point of discharge to the final grinding-surfaces, and at the same time the point where the greatest pressure is wanted—that is, the point where the final crushing is done before the material passes to the final grinding-surface—is brought closer to the center of motion, for the reason that the point at which the material passes from between the crushing-surfaces is closer to the center of motion than where the material first enters between such surfaces.

The outer casing or backing for the stationary crusher and grinder may be termed as being in the shape of a snail-shell—that is, its mouth or receiving-point is farther removed from the actual center of motion than the point at which the final crushing is performed, and the stationary crushing-ring or grinder, being secured to this backing-plate, forms between it and the movable crusher a channel or passage similar in configuration to the channel sage of the snail-shell, or gradually dec from the inlet to the outlet, where the ma discharged to the finer grinding-surfac this arrangement it will be seen that t terial from the hopper passes betw( crushing-surfaces at the wide point, a1 is drawn around by the action of the flanges and the centrifugal motion of volving grinder it will be subjected to ually-increasing crushing force by re the channel or passage between the tw( ers being gradually diminished in width crushing force is increased proportion: the material passes to the point where it leaves the crushing-surfaces, this bei: dent from the well-known fact that the to the center of motion the greater th that can be exerted without injurious The result of this is that the first cr which need not be very heavy, is pe1 at the point farthest removed from the of motion, while the final crushing, w1 quires increased force, is performed at near the center of motion.

Another advantage of this snail-shell channel is that if large pieces pass thro hopper-opening between the crusher pieces will be acted upon instead o thrown out, as is the case with the o form of crushing-surfaces, as they will d be drawn into the channel or passage ceive a gradually-increasing press1 which they will be effectually brok crushed by the time they reach the 1 discharge to the finer grinding-surfac it will be seen that by reason of thi shell or scroll shaped channel or passa$ will be no possibility of the material back or upward, for if it goes at all : go in the direction of the travel of the ing crusher, the revolution of which dr pieces downward and around in the ( or passage.

Figure 8:
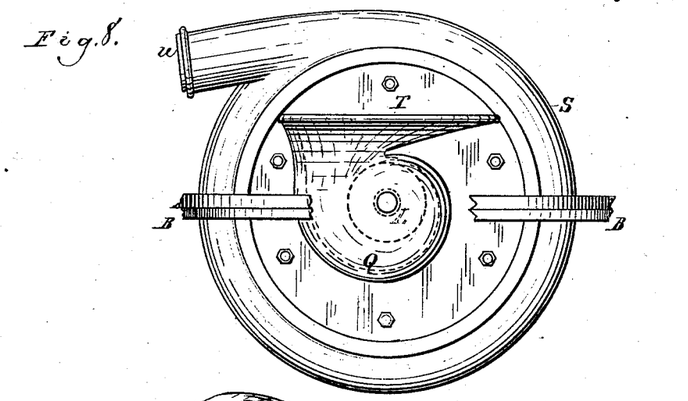
Fig. 8 is a front elevation, showing the upper supporting-ring, the casing for the grinders, and the hopper, and showing in dotted lines the relative relation between the movable and the stationary grinders.
Figure 9:
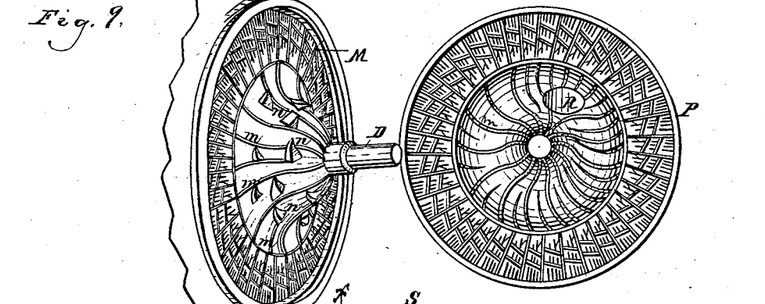
Fig. 9 is a perspective of the revolving grinder and a plan view of the stationary grinder, the latter showing by the grinding-ridges the shape of the channel or passage for the material.
Figure 10:
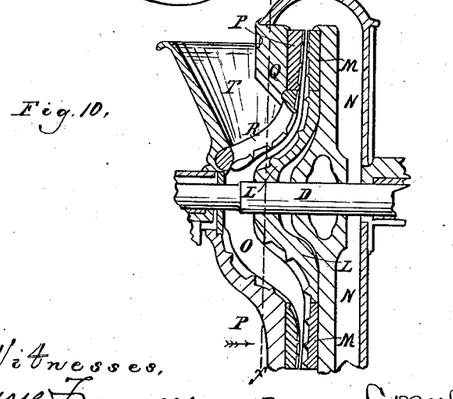
Fig. 10 is a detail in section, showing the relative position of the two grinders.
Figure 11:
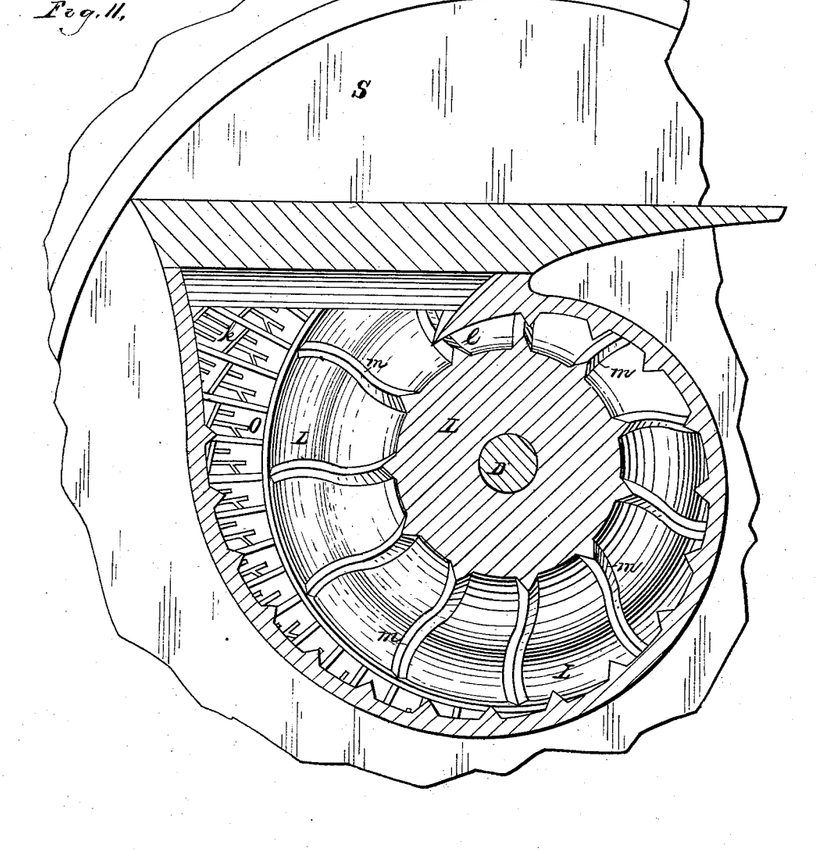
Fig. 11 is an enlarged detail in section, showing the grinders and the channel or passage between them for the material.

The dotted lines in Fig. 8, in connecti the sectional views, Figs. 10 and 11 clearly the arrangement of the crushi faces and the scroll-shaped channel t them. The ribs or flanges on the sta crusher decrease gradually in length fi point of entrance to the point of disch: shown clearly in Figs. 4 and 6, and th struction, in connection with the scroll channel and the movement of the re' grinder, draws the material in betw( grinding-surfaces, as before described.

What I claim as new, and desire to by Letters Patent, is as follows:

1. In a grinding-mill, a backing or s1 ing plate for a stationary crushing su1 ring, formed to have a snail-shell o1 shape, substantially as specified.

2. In a grinding-mill, the combinati( outer casing or shell forming a backi1 crushing surface or ring, with such c1 surface or ring, both having an interi